(12) United States Patent
Yamakaji

(10) Patent No.: US 10,256,467 B2
(45) Date of Patent: Apr. 9, 2019

(54) ELECTRODE MATERIAL AND METHOD FOR FORMING ELECTRODE MATERIAL

(71) Applicant: SEMICONDUCTOR ENERGY LABORATORY CO., LTD., Atsugi-shi, Kanagawa-ken (JP)

(72) Inventor: Masaki Yamakaji, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 280 days.

(21) Appl. No.: 15/232,977

(22) Filed: Aug. 10, 2016

(65) Prior Publication Data

US 2016/0351903 A1    Dec. 1, 2016

Related U.S. Application Data

(62) Division of application No. 13/162,640, filed on Jun. 17, 2011, now Pat. No. 9,419,271.

(30) Foreign Application Priority Data

Jul. 2, 2010 (JP) ................................ 2010-151742

(51) Int. Cl.
*H01M 4/525* (2010.01)
*H01M 4/04* (2006.01)
(Continued)

(52) U.S. Cl.
CPC ......... *H01M 4/525* (2013.01); *H01M 4/0402* (2013.01); *H01M 4/0471* (2013.01);
(Continued)

(58) Field of Classification Search
None
See application file for complete search history.

(56) References Cited

U.S. PATENT DOCUMENTS 5,910,382 A    6/1999   Goodenough et al.
6,085,015 A    7/2000   Armand et al.
(Continued)

FOREIGN PATENT DOCUMENTS

CN    101292389 A    10/2008
CN    101378897 A    3/2009
(Continued)

OTHER PUBLICATIONS

Zhou.F et al., "The Li intercalation potential of LiMPO4 and LiMSiO4 olivines with M=Fe, Mn, Co, Ni", Electrochemistry Communications, Nov. 1, 2004, vol. 6, No. 11, pp. 1144-1148.
(Continued)

*Primary Examiner* — Daniel S Gatewood
(74) *Attorney, Agent, or Firm* — Nixon Peabody LLP; Jeffrey L. Costellia

(57) ABSTRACT

An object is to provide an electrode material with high electrical conductivity and a power storage device using the electrode material. An object is to provide an electrode material with high capacity and a power storage device using the electrode material. Provided is a particulate electrode material including a core containing a compound represented by a general formula $Li_2MSiO_4$ (in the formula, M represents at least one kind of an element selected from Fe, Co, Mn, and Ni) as a main component, and a covering layer containing a compound represented by a general formula $LiMPO_4$ as a main component and covering the core. Further, a solid solution material is provided between the core and the covering layer. With such a structure, an electrode material with high electrical conductivity can be obtained. Further, with such an electrode material, a power storage device with high discharge capacity can be obtained.

19 Claims, 7 Drawing Sheets

(51) Int. Cl.
- *H01M 4/131* (2010.01)
- *H01M 10/0525* (2010.01)
- *H01M 4/36* (2006.01)
- *H01M 4/505* (2010.01)
- *H01M 4/485* (2010.01)
- *H01M 4/58* (2010.01)
- *H01M 4/62* (2006.01)

(52) U.S. Cl.
CPC .......... *H01M 4/131* (2013.01); *H01M 4/366* (2013.01); *H01M 4/485* (2013.01); *H01M 4/505* (2013.01); *H01M 4/5825* (2013.01); *H01M 4/625* (2013.01); *H01M 10/0525* (2013.01); *Y02E 60/122* (2013.01); *Y02P 70/54* (2015.11); *Y02T 10/7011* (2013.01)

(56) References Cited

U.S. PATENT DOCUMENTS

| | | |
|---|---|---|
| 6,391,493 B1 | 5/2002 | Goodenough et al. |
| 6,514,640 B1 | 2/2003 | Armand et al. |
| 7,718,314 B2 | 5/2010 | Komiyama et al. |
| 8,435,671 B2 | 5/2013 | Zaghib et al. |
| 8,568,617 B2 | 10/2013 | Zhou et al. |
| 8,586,182 B2 | 11/2013 | Suzuki et al. |
| 8,821,763 B2 | 9/2014 | Sano et al. |
| 9,029,022 B2 | 5/2015 | Miyagi et al. |
| 9,034,490 B2 | 5/2015 | Zaghib et al. |
| 9,112,236 B2 | 8/2015 | Miyagi et al. |
| 2004/0096743 A1 | 5/2004 | Okae et al. |
| 2007/0202407 A1 | 8/2007 | Eberman et al. |
| 2008/0193831 A1 | 8/2008 | Mah et al. |
| 2008/0203363 A1* | 8/2008 | Miyazaki ............... C01G 49/00 252/521.2 |
| 2008/0248382 A1 | 10/2008 | Sastry et al. |
| 2008/0268339 A1 | 10/2008 | Suzuki |
| 2009/0087660 A1* | 4/2009 | Suzuki .................... C01B 25/45 428/403 |
| 2010/0078591 A1 | 4/2010 | Sano et al. |
| 2010/0104943 A1 | 4/2010 | Thomas et al. |
| 2010/0140540 A1* | 6/2010 | Yamada ................. H01M 4/505 252/182.1 |
| 2010/0163790 A1 | 7/2010 | Ceder et al. |
| 2011/0068293 A1 | 3/2011 | Fujino et al. |
| 2011/0269023 A1 | 11/2011 | Kawakami et al. |
| 2011/0291055 A1 | 12/2011 | Kojima et al. |
| 2011/0294009 A1 | 12/2011 | Kawakami et al. |
| 2011/0300441 A1 | 12/2011 | Kawakami |
| 2012/0237833 A1 | 9/2012 | Guerfi et al. |
| 2015/0243936 A1 | 8/2015 | Miyagi et al. |
| 2017/0040593 A1 | 2/2017 | Miyagi et al. |

FOREIGN PATENT DOCUMENTS

| | | |
|---|---|---|
| CN | 101399336 A | 4/2009 |
| CN | 101465426 A | 6/2009 |
| EP | 1939971 A | 7/2008 |
| EP | 2043183 A | 4/2009 |
| EP | 2309573 A | 4/2011 |
| EP | 2560229 A | 2/2013 |
| EP | 3217463 A | 9/2017 |
| JP | 07-235292 A | 9/1995 |
| JP | 11-025983 A | 1/1999 |
| JP | 2002-075368 A | 3/2002 |
| JP | 2007-103339 A | 4/2007 |
| JP | 2007-335325 A | 12/2007 |
| JP | 2009-087682 A | 4/2009 |
| JP | 2009-170401 A | 7/2009 |
| JP | 2009-295533 A | 12/2009 |
| JP | 2010-086772 A | 4/2010 |
| JP | 2010-129332 A | 6/2010 |
| JP | 2012-048865 A | 3/2012 |
| JP | 2013-504858 | 2/2013 |
| WO | WO-2006/027925 | 3/2006 |
| WO | WO-2009/142283 | 11/2009 |
| WO | WO-2010/016545 | 2/2010 |

OTHER PUBLICATIONS

Kang.B et al., "Battery Materials for Ultrafast Charging and Discharging", Nature, Mar. 12, 2009, vol. 458, No. 7235, pp. 190-193.
Nyten.A et al., "The lithium extraction/insertion mechanism in Li2FeSiO4", J. Mater. Chem. (Journal of Materials Chemistry), 2006, vol. 16, No. 23, pp. 2266-2272.
Sirisopanaporn.C et al., "Dependence of Li2FeSiO4 Electrochemistry on Structure", J. Am. Chem. Soc. (Journal of the American Chemical Society), 2011, vol. 133, No. 5, pp. 1263-1265.
Dominko.R et al., "In-situ XAS study on Li2MnSiO4 and Li2FeSiO4 cathode materials", Journal of Power Sources, 2009, vol. 189, No. 1, pp. 51-58, Elsevier science direct.
Liang.G et al., "Lithium iron phosphate with high-rate capability synthesized through hydrothermal reaction in glucose solution", Journal of Power Sources, 2008, vol. 184, pp. 538-542.
Chinese Office Action (Application No. 201110189756.1) dated Aug. 1, 2014.
Information Offer Form (Application No. 2011-143409) dated Feb. 2, 2015.
Notification (Application No. 2011-143409) dated Feb. 10, 2015.
Notification (Application No. 2011-143409) dated Feb. 17, 2015.
Information Offer Form (Application No. 2011-143409) dated Feb. 9, 2015.
Chinese Office Action (Application No. 201110189756.1) dated Mar. 26, 2015.
Philip.W, The New Encyclopaedia Britannica, 15th Edition, vol. 10, p. 945, Encyclopredia Britannica, Inc.
Chinese Office Action (Application No. 201610140284.3) dated Nov. 30, 2017.

* cited by examiner

ELECTRODE MATERIAL AND METHOD FOR FORMING ELECTRODE MATERIAL

BACKGROUND OF THE INVENTION

1. Field of the Invention

The present invention relates to an electrode material and a method for forming the electrode material.

2. Description of the Related Art

The field of portable electronic devices such as personal computers and cellular phones has progressed significantly. The portable electronic device needs a chargeable power storage device having high energy density, which is small, lightweight, and reliable. As such a power storage device, for example, a lithium-ion secondary battery is known. In addition, development of electrically propelled vehicles on which secondary batteries are mounted has also been progressing rapidly from a rise of growing awareness to environmental problems and energy problems.

In a lithium-ion secondary battery, as a positive electrode active material, a phosphate compound having an olivine structure and containing lithium (Li) and iron (Fe), manganese (Mn), cobalt (Co), or nickel (Ni), such as lithium iron phosphate ($LiFePO_4$), lithium manganese phosphate ($LiMnPO_4$), lithium cobalt phosphate ($LiCoPO_4$), or lithium nickel phosphate ($LiNiPO_4$), has been known (see Patent Document 1, Non-Patent Document 1, and Non-Patent Document 2).

Further, it is proposed that a silicate-based (silicate salt) compound having the same olivine structure as the phosphate compound having an olivine structure be used as a positive electrode active material of a lithium-ion secondary battery (for example, Patent Document 2). Furthermore, in Patent Document 2, a method for increasing conductivity of a positive electrode active material by including a carbon component in the positive electrode active material is disclosed.

REFERENCE

Patent Documents

[Patent Document 1] Japanese Published Patent Application No. H11-25983
[Patent Document 2] Japanese Published Patent Application No. 2007-335325

Non-Patent Documents

[Non-Patent Document 1] Byoungwoo Kang, Gerbrand Ceder, "Nature", 2009, Vol. 458 (12), pp. 190-193
[Non-Patent Document 2] F. Zhou et al., "Electrochemistry Communications", 2004, Vol. 6, pp. 1144-1148

SUMMARY OF THE INVENTION

However, the bulk electrical conductivity of a phosphate compound having an olivine structure or a silicate salt compound having an olivine structure is low, and it is difficult for a single particle to obtain characteristics sufficient for use as an electrode material.

In view of the foregoing problem, one of objects of the disclosed invention is to provide an electrode material with improved electrical conductivity and a power storage device using the electrode material in one embodiment of the disclosed invention.

Further, one of objects is to provide an electrode material with high capacity and a power storage device using the electrode material in one embodiment of the disclosed invention.

One embodiment of the present invention is an electrode material and a method for forming an electrode material. Details thereof will be described below.

One embodiment of the present invention is a particulate electrode material including a core containing a compound represented by a general formula $Li_2MSiO_4$ (in the formula, M represents at least one kind of an element selected from Fe, Co, Mn, and Ni) as a main component, and a covering layer containing a compound represented by a general formula $LiMPO_4$ as a main component and covering the core.

M included in the general formula $Li_2MSiO_4$ may be different from or the same as M included in the general formula $LiMPO_4$. Further, it is preferable that the compound represented by the general formula $LiMPO_4$ have high conductivity as compared to the compound represented by the general formula $Li_2MSiO_4$.

In the structure, a solid solution material is preferably provided between the core and the covering layer.

In the structure, a carbon coat layer which covers the covering layer is preferably provided. In the structure, the carbon coat layer preferably has a thickness of greater than 0 nm and less than or equal to 100 nm.

In the structure, the particle preferably has a grain diameter of greater than or equal to 10 nm and less than or equal to 100 nm.

In the structure, the weight of the core is preferably heavier than the weight of the covering layer.

In accordance with one embodiment of the present invention, an electrode material with high electrical conductivity can be obtained. Further, with such an electrode material, a power storage device with high discharge capacity can be obtained.

DETAILED DESCRIPTION OF THE INVENTION

Figure 1A:
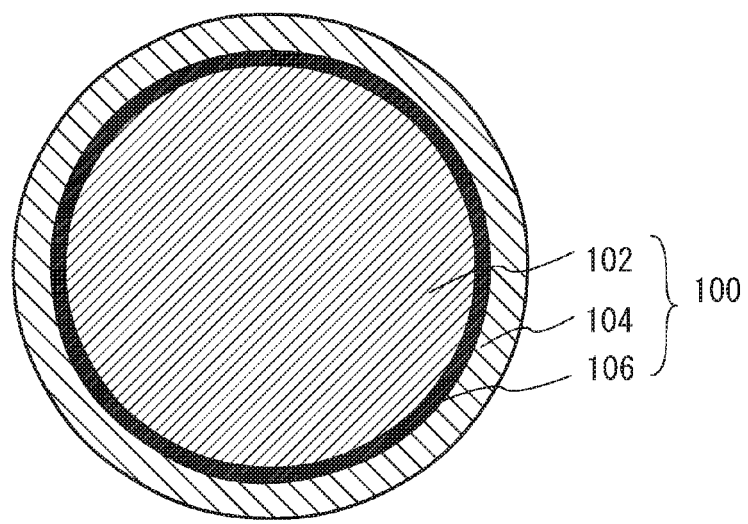
FIGS. 1A and 1B are cross-sectional views of positive electrode active materials (in particle form)

Hereinafter, embodiments are described in detail with reference to the drawings. Note that the invention is not limited to the following description of the embodiments, and it is readily appreciated by those skilled in the art that modes and details of the invention can be modified in a variety of ways without departing from the spirit of the invention disclosed in this specification and the like. Structures of different embodiments can be implemented in combination as appropriate. Note that in structures of the invention described below, the same portions or portions having similar functions are denoted by common reference numerals, and detailed description thereof will be omitted.

Note that the position, the size, the range, or the like of each structure illustrated in the drawings and the like is not accurately represented in some cases for easy understanding. Therefore, the present invention is not necessarily limited to the position, size, range, or the like disclosed in the drawings and the like.

Note that terms with ordinal numbers such as "first", "second", and "third" in this specification are used in order to identify components, and the terms do not limit the components numerically.

Embodiment 1

In this embodiment, a structure of an electrode material which is one embodiment of the present invention will be described with reference to FIGS. 1A and 1B.

FIG. 1A is a schematic cross-sectional view of a positive electrode active material 100 which is one embodiment of the present invention.

The positive electrode active material 100 is in particle form, and a positive electrode active material layer which is described later is formed using a plurality of positive electrode active materials 100 in particle form.

As shown in FIG. 1A, the positive electrode active material 100 includes a core 102 containing a compound represented by a general formula $Li_2MSiO_4$ (in the formula, M represents at least one kind of an element selected from Fe, Co, Mn, and Ni) as a main component, and a covering layer 104 containing a compound represented by a general formula $LiMPO_4$ as a main component and covering the core 102. Further, a solid solution material 106 exists between the core 102 and the covering layer 104. In the solid solution material 106, a slight amount of the compound represented by the general formula $LiMPO_4$ is dissolved in the compound represented by the general formula $Li_2MSiO_4$. In the solid solution material 106, about 10% of the compound represented by the general formula $LiMPO_4$ is preferably dissolved in the compound represented by the general formula $Li_2MSiO_4$.

As illustrated in FIG. 1A, the solid solution material 106 exists between the core 102 containing the compound represented by the general formula $Li_2MSiO_4$ as a main component and the covering layer 104 containing the compound represented by the general formula $LiMPO_4$ as a main component. Thus, an energy barrier when Li in the general formula $Li_2MSiO_4$ is inserted into and extracted from the surface of the positive electrode active material 100 can be decreased. As a result, the positive electrode active material 100 makes it possible to bring the available capacity close to the theoretical capacity. Further, electrical conductivity of the positive electrode active material 100 can be improved.

The positive electrode active material 100 has a core-shell structure. The core-shell structure is a structure in which one of two chemical species forms a core, and the other of the two chemical species covers the core like a shell. With such a structure, the core can be made stable by the covering layer 104, the covering layer 104 can have high functionality by the core 102, and characteristics of the core 102 and the covering layer 104 can be concurrently used. That is to say, the core 102 includes the compound represented by the general formula $Li_2MSiO_4$, whereby 2 mol of Li is included in 1 mol of a transition metal; thus, the positive electrode active material 100 can be used as an electrode material with high capacity. Further, the core 102 is covered with the compound represented by $LiMPO_4$ with higher electric conductivity than the compound represented by the general formula $Li_2MSiO_4$, whereby an electrode material with high capacity and high electric conductivity (the positive electrode active material 100) can be formed.

Figure 1B:
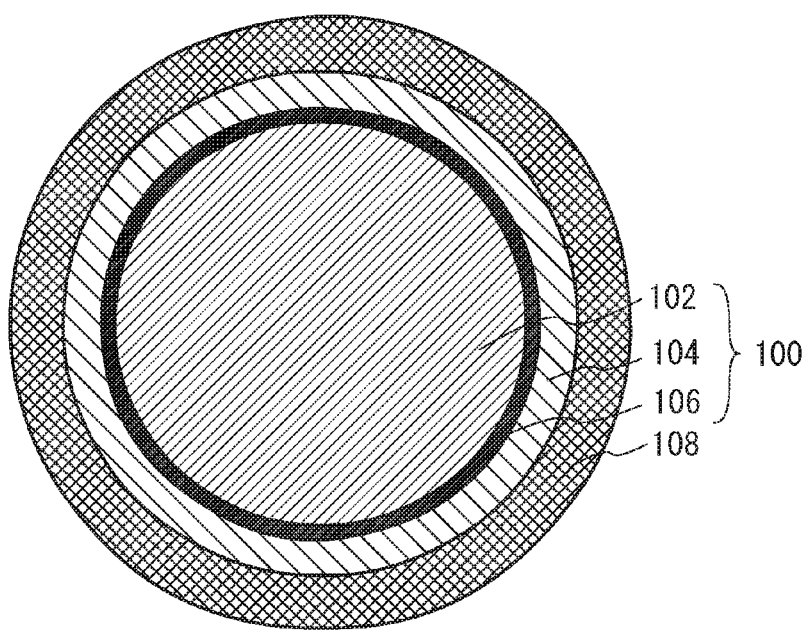

The positive electrode active material 100 illustrated in FIG. 1B includes the core 102 containing the compound represented by the general formula $Li_2MSiO_4$ as a main component, and the covering layer 104 containing the compound represented by the general formula $LiMPO_4$ as a main component and covering the core 102. Further, the covering layer 104 is covered with a carbon coat layer 108. Furthermore, the solid solution material 106 exists between the core 102 and the covering layer 104.

With the carbon coat layer 108 provided on the surface of the covering layer 104 as illustrated in FIG. 1B, the conductivity of the positive electrode active material 100 can be improved. Further, when the positive electrode active materials 100 are in contact with each other through the carbon coat layers 108, the positive electrode active materials 100 are electrically connected to each other, whereby the electric conductivity of the positive electrode active material 100 can be further improved.

Next, an example of a method for forming the electrode material (the positive electrode active material 100) which is one embodiment of the present invention is described.

First, an example of a method for forming the core 102 containing the compound represented by the general formula $Li_2MSiO_4$ is described.

First, a solution is added to a compound to be a supply source of Li, a compound to be a supply source of M, and a compound to be a supply source of Si in the general formula, and mixture is performed; thus, a mixture material is formed. M in the general formula represents, for example, one or more of elements selected from iron (Fe), manganese (Mn), cobalt (Co), nickel (Ni), and the like.

As the compound to be a supply source of Li in the general formula, for example, lithium salt such as lithium carbonate ($Li_2CO_3$), lithium oxide ($Li_2O$), lithium sulfide ($Li_2S$), lithium peroxide ($Li_2O_2$), lithium sulfate ($Li_2SO_4$), lithium sulfite ($Li_2SO_3$), or lithium thiosulfate ($Li_2S_2O_3$) can be used.

As the compound to be a supply source of M in the general formula, for example, an oxide such as iron(II) oxide (FeO), manganese(II) oxide (MnO), cobalt(II) oxide (CoO), or nickel(II) oxide (NiO), or an oxalate such as iron(II) oxalate dehydrate ($FeC_2O_4 \cdot 2H_2O$), manganese(II) oxalate dehydrate ($MnC_2O_4 \cdot 2H_2O$), cobalt(II) oxalate dehydrate ($CoC_2O_4 \cdot 2H_2O$), or nickel(II) oxalate dehydrate ($NiC_2O_4 \cdot 2H_2O$) can be used.

As the compound to be a supply source of Si in the general formula, for example, silicon oxide ($SiO_2$) can be used.

Further, lithium metasilicate ($Li_2SiO_3$) can be used as a raw material for introducing lithium and silicate.

Next, a solvent is added to the compound to be a supply source of Li, the compound to be a supply source of M, and the compound to be a supply source of Si in the general formula, and mixture is performed; thus, a mixture material is formed.

As a method for mixing the compound to be a supply source of Li, the compound to be a supply source of M, and the compound to be a supply source of Si in the general formula, a ball mill treatment can be used, for example. A specific method is as follows. A solvent such as acetone which is highly volatile is added to the compounds, and with the use of a ball (having a ball diameter of greater than or equal to φ1 mm and less than or equal to φ10 mm) made of metal or ceramic, treatment is performed at greater than or equal to 50 rpm and less than or equal to 500 rpm for greater than or equal to 30 minutes and less than or equal to 5 hours. By performing a ball mill treatment, the compounds can be microparticulated as well as being mixed, so that $Li_2MSiO_4$ after formation can be microparticulated. In addition, by performing a ball mill treatment, the compounds can be uniformly mixed and the crystallinity of the electrode material after formation can be made high. Although acetone is used as the solvent, ethanol, methanol, or the like can also be used.

For example, a ball mill treatment may be performed as follows: lithium metasilicate is used as the compound to be a supply source of Li and the compound to be a supply source of Si in the general formula, and iron(II) oxalate dehydrate is used as the compound to be a supply source of M in the general formula, and acetone is added as the solvent.

Subsequently, the mixture material is heated, so that the solvent (acetone) is evaporated. Then, pressure is applied to the mixture material with the use of a pellet press, so that the mixture material is shaped into pellets. The pellets are subjected to first heat treatment (pre-baking).

For example, the mixture material of the compounds (lithium metasilicate and iron(II) oxalate dehydrate) subjected to the ball mill treatment is heated to 50° C., so that the solvent (acetone) is evaporated. Then, pressure of 14.7 Pa (150 kgf/cm$^2$) is applied to the mixture material with the use of a pellet press for 5 minutes, so that the mixture material is shaped into pellets. Then, the mixture shaped into pellets is subjected to first heat treatment (pre-baking) under a nitrogen atmosphere.

The first heat treatment may be performed at higher than or equal to 250° C. and lower than or equal to 450° C., preferably lower than or equal to 400° C., for greater than or equal to 1 hour and less than or equal to 20 hours, preferably less than or equal to 10 hours. In this embodiment, the first heat treatment is performed at a baking temperature of 350° C. for 10 hours. By the first heat treatment (pre-baking) at a low temperature of less than or equal to 400° C., iron(II) oxalate dehydrate can be changed into iron(II) oxide.

In order to prevent oxidation of M in the general formula, the first heat treatment may be performed under an inert gas atmosphere. For example, as the inert gas atmosphere, nitrogen, a rare gas (helium, neon, argon, xenon, or the like), or the like can be used. Alternatively, the first heat treatment may be performed under a hydrogen atmosphere.

Next, the mixture material subjected to the first heat treatment is ground with the use of a mortar or the like, and the mixture material is shaped into pellets again. The pellets are subjected to second heat treatment (main baking).

The second heat treatment can be performed, for example, under an inert gas atmosphere at a baking temperature of higher than or equal to 700° C. and lower than or equal to 800° C. for greater than or equal to 1 hour and less than or equal to 20 hours. The second heat treatment can be performed, for example, under a nitrogen atmosphere at a baking temperature of 700° C. for 10 hours. By the second heat treatment, a core of the electrode material which is microparticulated can be formed.

Through the above steps, the core 102 containing the compound represented by $Li_2MSiO_4$ can be formed.

Next, an example of a method for forming the covering layer 104 containing the compound represented by $LiMPO_4$ and covering the core 102 is described.

First, a solution is added to a compound to be a supply source of Li, a compound to be a supply source of M, and a compound to be a supply source of $PO_4$ in the general formula, and mixture is performed; thus, a mixture material is formed. M in the general formula represents, for example, one or more of elements selected from iron (Fe), manganese (Mn), cobalt (Co), nickel (Ni), and the like.

Since the compound to be a supply source of Li and the compound to be a supply source of M in the general formula can be formed using the materials described in the method for forming $Li_2MSiO_4$, the detailed description is omitted. Further, M included in the general formula $Li_2MSiO_4$ may be different from or the same as M included in the general formula $LiMPO_4$.

As the compound to be a supply source of $PO_4$ in the general formula, for example, diammonium hydrogen phosphate $((NH_4)_2HPO_4)$, ammonium dihydrogen phosphate $(NH_4H_2PO_4)$, or phosphorus pentoxide $(P_2O_5)$ can be used.

First, the compound represented by $Li_2MSiO_4$ is ground with the use of a mortar or the like. Then, a solvent is added to the compound to be a supply source of Li, the compound to be a supply source of M, and the compound to be a supply source of $PO_4$ in the general formula, and mixture is performed; thus, the mixture material is formed.

As a method for mixing the compound to be a supply source of Li, the compound to be a supply source of M, and the compound to be a supply source of $PO_4$ in the general formula, a ball mill treatment may be performed. The detailed description of a specific method of a ball mill treatment is omitted because the method described in the method for forming $Li_2MSiO_4$ can be applied thereto. By performing a ball mill treatment, the compounds can be microparticulated as well as being mixed.

For example, a ball mill treatment may be performed as follows: $Li_2CO_3$ is used as the compound to be a supply source of Li, $FeC_2O_4 \cdot 2H_2O$ is used as the compound to be a supply source of M, and $NH_4H_2PO_4$ is used as the compound to be a supply source of $PO_4$, and acetone is added as the solvent.

Subsequently, the mixture material is heated, so that the solvent (acetone) is evaporated. Then, pressure is applied to the mixture material with the use of a pellet press, so that the mixture material is shaped into pellets. The pellets are subjected to third heat treatment (pre-baking).

For example, the mixture material of the compounds ($Li_2CO_3$, $FeC_2O_4 \cdot 2H_2O$, and $NH_4H_2PO_4$) subjected to the ball mill treatment is heated to 50° C., so that the solvent (acetone) is evaporated. Then, pressure of 14.7 Pa (150 kgf/cm$^2$) is applied to the mixture material with the use of a pellet press for 5 minutes, so that the mixture material is shaped into pellets. Then, the mixture shaped into pellets is subjected to the third heat treatment (pre-baking) under a nitrogen atmosphere at a baking temperature of 350° C. for 10 hours. By performing the third heat treatment, the core 102 containing the compound represented by the general formula $Li_2MSiO_4$ and the covering layer 104 containing the compound represented by the general formula $LiMPO_4$ and covering the core 102 can be formed. For example, $Li_2FeSiO_4$ can be formed as the core 102, and $LiFePO_4$ can be formed as the covering layer 104. The weight of the core 102 is heavier than the weight of the covering layer 104.

Next, fourth heat treatment (main baking) is performed at a high temperature (600° C.). By performing the fourth heat treatment, elements included in the core 102 (e.g., $Li_2FeSiO_4$) and the covering layer 104 (e.g., $LiFePO_4$) are diffused into the core 102 and the covering layer 104, so that the solid solution material 106 in which the boundary between the core 102 and the covering layer 104 is unclear is formed. By formation of the solid solution material 106, the structure shown in FIGS. 1A and 1B (the positive electrode active material 100) can be formed. When such a solid solution material 106 exists, Li included in the core 102 is easily and effectively inserted and extracted as compared to the case where the solid solution material 106 does not exist. Further, by performing the fourth heat treatment, the crystallinity of $LiMPO_4$ can be increased. By increase of the crystallinity of $LiMPO_4$, Li can be inserted and extracted more easily.

Note that in the fourth heat treatment, an organic compound such as glucose may be added. When the subsequent steps are performed after glucose is added, carbon supplied from the glucose is supported on the surface of the positive electrode active material (see FIG. 1B).

Note that in this specification, a state in which a surface of the covering layer 104 is supported with carbon also means that an iron phosphate compound is carbon-coated.

The thickness of the carbon with which the surface of the covering layer 104 is supported (also referred to as the carbon coat layer 108) is greater than 0 nm and less than or equal to 100 nm, preferably greater than or equal to 2 nm and less than or equal to 10 nm.

By supporting carbon on the surface of the covering layer 104, the conductivity of the surface of the positive electrode active material 100 can be increased. In addition, when the positive electrode active materials 100 are in contact with each other through carbon supported on the surfaces, the positive electrode active materials 100 are electrically connected to each other; thus, the conductivity of the positive electrode active material 100 can be further increased.

If the carbon coat layer 108 is formed on the core 102, the core 102 might be reduced. However, by formation of the covering layer 104 on the core 102 as in one embodiment of the present invention, the reduction of the core 102 by the carbon coat layer 108 can be suppressed.

Note that although glucose is used in this embodiment as a carbon supply source because glucose easily reacts with a phosphate group included in the covering layer 104, cyclic monosaccharide, straight-chain monosaccharide, or polysaccharide which reacts well with a phosphate group may be used instead of glucose.

Note that although an example in which an organic compound is added in the fourth heat treatment is described in this embodiment, one embodiment of the present invention is not limited thereto. An organic compound may be added after fifth heat treatment to form the carbon coat layer 108.

The grain size of the particle of the positive electrode active material 100, which is obtained through the fourth heat treatment, is greater than or equal to 10 nm and less than or equal to 100 nm, preferably greater than or equal to 20 nm and less than or equal to 60 nm. The particle of the positive electrode active material 100 is small when the grain size of the particle of the positive electrode active material 100 is within the above range; therefore, lithium ions are easily inserted and extracted. Thus, rate characteristics of a power storage device are improved and charge and discharge can be performed in a short time.

The baking temperature of $Li_2MSiO_4$ is higher than the baking temperature of $LiMPO_4$ by 100° C. or more. Therefore, the thickness of the solid solution material 106 can be made thin.

As a formation method of the core 102, a sol-gel method, a hydrothermal method, a coprecipitation method, a spray drying method, or the like may be used instead of the method described in this embodiment. Further, as a formation method of the covering layer 104, a sputtering method, a CVD method, a sol-gel method, a hydrothermal method, a coprecipitation method, or the like may be used instead of the method described in this embodiment.

This embodiment can be combined with any other embodiment.

Embodiment 2

In this embodiment, a lithium-ion secondary battery in which an electrode material obtained by the formation steps described in Embodiment 1 is used as a positive electrode active material is described. The schematic structure of the lithium-ion secondary battery is illustrated in FIG. 2.

Figure 2:
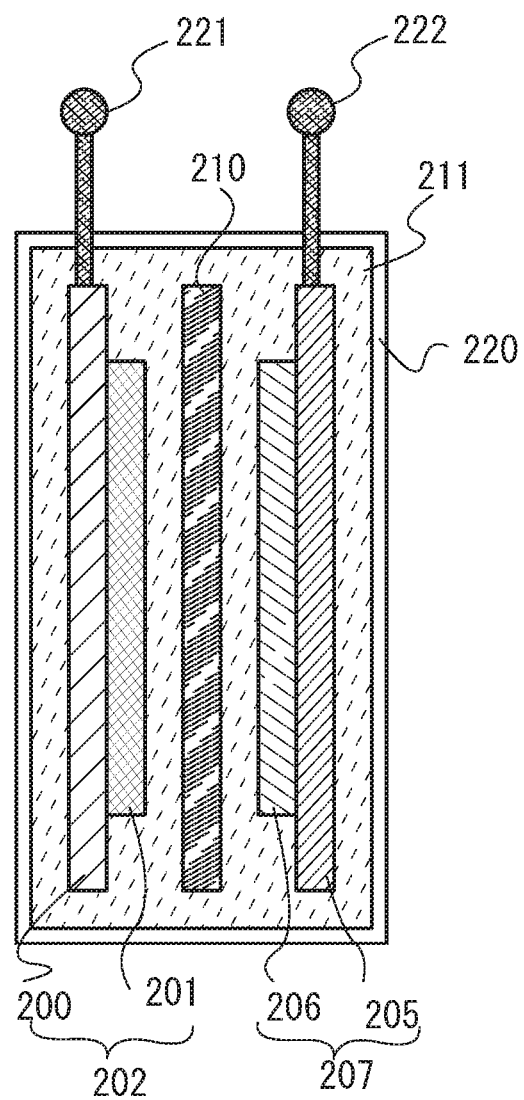
FIG. 2 illustrates one example of a cross-sectional view of a power storage device.

In the lithium-ion secondary battery illustrated in FIG. 2, a positive electrode 202, a negative electrode 207, and a separator 210 are provided in a housing 220 which is isolated from the outside, and an electrolyte solution 211 is filled in the housing 220. In addition, the separator 210 is provided between the positive electrode 202 and the negative electrode 207.

A first electrode 221 and a second electrode 222 are connected to a positive electrode current collector 200 and a negative electrode current collector 205, respectively, and charge and discharge are performed by the first electrode 221 and the second electrode 222. Moreover, there are certain gaps between a positive electrode active material layer 201 and the separator 210 and between a negative electrode active material layer 206 and the separator 210. However, the structure is not particularly limited thereto; the positive electrode active material layer 201 may be in contact with the separator 210, and the negative electrode active material layer 206 may be in contact with the separator 210. Further, the lithium-ion secondary battery may be rolled into a cylinder shape with the separator 210 provided between the positive electrode 202 and the negative electrode 207.

The positive electrode active material layer 201 is formed on the positive electrode current collector 200. The positive electrode active material layer 201 includes a plurality of electrode materials formed in Embodiment 1. On the other hand, the negative electrode active material layer 206 is formed on the negative electrode current collector 205. In this specification, the positive electrode active material layer 201 and the positive electrode current collector 200 on which the positive electrode active material layer 201 is formed are collectively referred to as the positive electrode 202. The negative electrode active material layer 206 and the negative electrode current collector 205 on which the negative electrode active material layer 206 is formed are collectively referred to as the negative electrode 207.

Note that the "active material" refers to a material that relates to insertion and extraction of ions which function as carriers and does not include a carbon layer including glucose, or the like. Thus, the conductivity of the active material refers to the conductivity of the active material itself and does not refer to the conductivity of an active material layer including a carbon layer which is formed on a surface thereof.

As the positive electrode current collector 200, a material having high conductivity such as aluminum or stainless steel can be used. The electrode current collector 200 can have a foil shape, a plate shape, a net shape, or the like as appropriate.

In the positive electrode active material layer 201, the positive electrode active material 100 described in Embodiment 1 which includes the core 102 containing the compound represented by the general formula $Li_2MSiO_4$ and the covering layer 104 containing the compound represented by the general formula $LiMPO_4$ as a main component and covering the core 102, is included. Alternatively, the positive electrode active material 100 described in Embodiment 1 which includes the core 102 containing the compound represented by the general formula $Li_2MSiO_4$ and the covering layer 104 containing the compound represented by the general formula $LiMPO_4$ as a main component and covering the core 102, and the carbon coat layer 108 which covers the positive electrode active material 100 are included. It is preferable that the solid solution material 106 exist between the core 102 and the covering layer 104.

After the fourth heat treatment (main baking) described in Embodiment 1, the positive electrode active material 100 is ground again with the use of a ball mill machine to obtain fine powder. A conduction auxiliary agent, a binder, or a solvent is mixed into the obtained fine powder to obtain paste.

As the conduction auxiliary agent, a material which is itself an electron conductor and does not cause chemical reaction with other materials in a battery device may be used. For example, carbon-based materials such as graphite, carbon fiber, carbon black, acetylene black, and VGCF (registered trademark); metal materials such as copper, nickel, aluminum, and silver; and powder, fiber, and the like of mixtures thereof can be given. The conduction auxiliary agent is a material that assists conductivity between active materials; it is filled between active materials which are apart and makes conduction between the active materials.

As the binder, a polysaccharide such as starch, polyvinyl alcohol, carboxymethyl cellulose, hydroxypropyl cellulose, regenerated cellulose, or diacetyl cellulose; a thermoplastic resin such as polyvinyl chloride, polyvinyl pyrrolidone, polytetrafluoroethylene, polyvinylide fluoride, polyethylene, or polypropylene; or a polymer with rubber elasticity such as ethylene-propylene-diene monomer (EPDM), sulfonated EPDM, styrene-butadiene rubber, butadiene rubber, fluorine rubber, or polyethylene oxide can be given.

The positive electrode active material 100 used as the electrode material, the conduction auxiliary agent, and the binder are mixed at 80 wt % to 96 wt %, 2 wt % to 10 wt %, and 2 wt % to 10 wt %, respectively, to be 100 wt % in total. Further, an organic solvent, the volume of which is approximately the same as that of the mixture of the electrode material, the conduction auxiliary agent, and the binder, is mixed therein and processed into a slurry state. Note that an object which is obtained by processing, into a slurry state, a mixture of the electrode material, the conduction auxiliary agent, the binder, and the organic solvent is referred to as slurry. As the solvent, N-methyl-2-pyrrolidone, lactic acid ester, or the like can be used. The proportions of the active material, the conduction auxiliary agent, and the binder are preferably adjusted as appropriate in such a manner that, for example, when the active material and the conduction auxiliary agent have low adhesiveness at the time of film formation, the amount of binder is increased, and when the resistance of the active material is high, the amount of conduction auxiliary agent is increased.

Here, an aluminum foil is used as the positive electrode current collector 200, and the slurry is dropped thereon and is thinly spread by a casting method. Then, the slurry is further stretched by a roller press machine and the thickness is made uniform. And then, vacuum drying (under a pressure of less than or equal to 10 Pa) or heat drying (at a temperature of 150° C. to 280° C.) is performed. Thus, the positive electrode active material layer 201 is formed over the positive electrode current collector 200. As the thickness of the positive electrode active material layer 201, a desired thickness is selected from the range of 20 μm to 100 μm. It is preferable to adjust the thickness of the positive electrode active material layer 201 as appropriate so that cracks and separation do not occur. Further, it is preferable that cracks and separation be made not to occur on the positive electrode active material layer 201 not only when the positive electrode current collector is flat but also when the positive electrode current collector is rolled into a cylinder shape, though it depends on the form of the lithium-ion secondary battery.

As the negative electrode current collector 205, a material having high conductivity such as copper, stainless steel, iron, or nickel can be used.

As the negative electrode active material layer 206, lithium, aluminum, graphite, silicon, germanium, or the like is used. The negative electrode active material layer 206 may be formed on the negative electrode current collector 205 by a coating method, a sputtering method, an evaporation method, or the like. Alternatively, each material may be used alone as the negative electrode active material layer 206. The theoretical lithium occlusion capacity is larger in germanium, silicon, lithium, and aluminum than graphite. When the occlusion capacity is large, charge and discharge can be performed sufficiently even in a small area and a function as a negative electrode can be obtained; therefore, cost reduction and miniaturization of a secondary battery can be realized. However, in the case of silicon or the like, the volume is increased approximately four times as large as the volume before lithium occlusion; therefore, it is necessary to pay attention to the risk of explosion, the probability that the material itself gets vulnerable, and the like.

As an electrolyte, an electrolyte solution that is an electrolyte in a liquid state, a solid electrolyte that is an electrolyte in a solid state may be used. The electrolyte solution contains an alkali metal ion or an alkaline earth metal ion as a carrier ion, and this carrier ion is responsible for electric conduction. Examples of the alkali metal ion include a lithium ion, a sodium ion, and potassium ion. Examples of the alkaline earth metal ion include a calcium ion, a strontium ion, and a barium ion.

The electrolyte solution 211 includes, for example, a solvent and a lithium salt or a sodium salt dissolved in the solvent. Examples of the lithium salt include lithium chloride (LiCl), lithium fluoride (LiF), lithium perchlorate (LiClO$_4$), lithium tetrafluoroborate (LiBF$_4$), LiAsF$_6$, LiPF$_6$, and Li(C$_2$FsSO$_2$)$_2$N. Examples of the sodium salt include sodium chloride (NaCl), sodium fluoride (NaF), sodium perchlorate (NaClO$_4$), and sodium fluoroborate (NaBF$_4$).

Examples of the solvent for the electrolyte solution 211 include cyclic carbonates (e.g., ethylene carbonate (hereinafter abbreviated to EC), propylene carbonate (PC), butylene carbonate (BC), and vinylene carbonate (VC)); acyclic carbonates (e.g., dimethyl carbonate (DMC), diethyl carbonate (DEC), ethylmethyl carbonate (EMC), methylpropyl carbonate (MPC), methylisobutyl carbonate (MIBC), and dipropyl carbonate (DPC)); aliphatic carboxylic acid esters (e.g., methyl formate, methyl acetate, methyl propionate, and ethyl propionate); acyclic ethers (e.g., 1,2-dimethoxyethane (DME), 1,2-diethoxyethane (DEE), ethoxymethoxyethane (EME), and γ-lactones such as γ-butyrolactone); cyclic ethers (e.g., tetrahydrofuran and 2-methyltetrahydrofuran); cyclic sulfones (e.g., sulfolane); alkyl phosphate ester (e.g., dimethylsulfoxide and 1,3-dioxolane, and trimethyl phosphate, triethyl phosphate, and trioctyl phosphate);

and fluorides thereof. All of the above solvents can be used either alone or in combination.

As the separator 210, paper, nonwoven fabric, a glass fiber, a synthetic fiber such as nylon (polyamide), vinylon (also called vinalon) (a polyvinyl alcohol based fiber), polyester, acrylic, polyolefin, or polyurethane, or the like may be used. However, a material which does not dissolve in the above-described electrolyte solution 211, should be selected.

More specific examples of materials for the separator 210 are high-molecular compounds based on fluorine-based polymer, polyether such as polyethylene oxide and polypropylene oxide, polyolefin such as polyethylene and polypropylene, polyacrylonitrile, polyvinylidene chloride, polymethyl methacrylate, polymethylacrylate, polyvinyl alcohol, polymethacrylonitrile, polyvinyl acetate, polyvinylpyrrolidone, polyethyleneimine, polybutadiene, polystyrene, polyisoprene, and polyurethane, derivatives thereof, cellulose, paper, and nonwoven fabric, all of which can be used either alone or in combination.

When charge of the lithium-ion secondary battery described above is performed, a positive electrode terminal is connected to the first electrode 221 and a negative electrode terminal is connected to the second electrode 222. An electron is taken away from the positive electrode 202 through the first electrode 221 and transferred to the negative electrode 207 through the second electrode 222. In addition, a lithium ion is eluted from the active material in the positive electrode active material layer 201 from the positive electrode, reaches the negative electrode 207 through the separator 210, and is taken in the active material in the negative electrode active material layer 206. The lithium ion and the electron are aggregated in this region and are occluded in the negative electrode active material layer 206. At the same time, in the positive electrode active material layer 201, an electron is released outside from the active material, and an oxidation reaction of a metal M contained in the active material occurs.

At the time of discharge, in the negative electrode 207, the negative electrode active material layer 206 releases lithium as an ion, and an electron is transferred to the second electrode 222. The lithium ion passes through the separator 210, reaches the positive electrode active material layer 201, and is taken in the active material in the positive electrode active material layer 201. At that time, the electron from the negative electrode 207 also reaches the positive electrode 202, and a reduction reaction of the metal M occurs.

A lithium-ion secondary battery which is manufactured as described above includes a lithium phosphate compound having an olivine structure or a lithium silicate compound having an olivine structure as the positive electrode active material. Further, a second metal element which causes generation of carriers is added to the lithium phosphate compound or the lithium silicate compound, whereby bulk electrical conductivity is improved. Therefore, a lithium-ion secondary battery obtained in this embodiment can be a lithium-ion secondary battery with high discharge capacity, which is charged and discharged at high rate.

The structures, methods, and the like described in this embodiment can be combined as appropriate with any of the structures, methods, and the like described in the other embodiments.

Embodiment 3

In this embodiment, an application example of the power storage device described in Embodiment 2 is described.

The power storage device described in Embodiment 2 can be used in electronic devices, e.g., cameras such as digital cameras or video cameras, digital photo frames, mobile phones (also referred to as cellular phones or cellular phone devices), portable game machines, portable information terminals, or audio reproducing devices. Further, the power storage device can be used in electric propulsion vehicles such as electric vehicles, hybrid vehicles, train vehicles, maintenance vehicles, carts, wheelchairs, and bicycles.

Figure 3A:
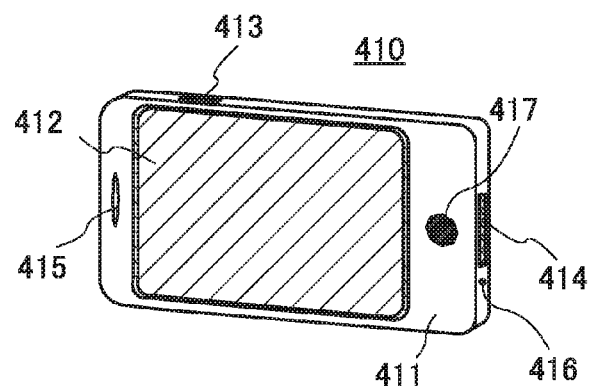
FIGS. 3A and 3B are diagrams each illustrating an application example of a power storage device.

FIG. 3A illustrates an example of a mobile phone. In a mobile phone 410, a display portion 412 is incorporated in a housing 411. The housing 411 is provided with an operation button 413, an operation button 417, an external connection port 414, a speaker 415, a microphone 416, and the like.

Figure 3B:
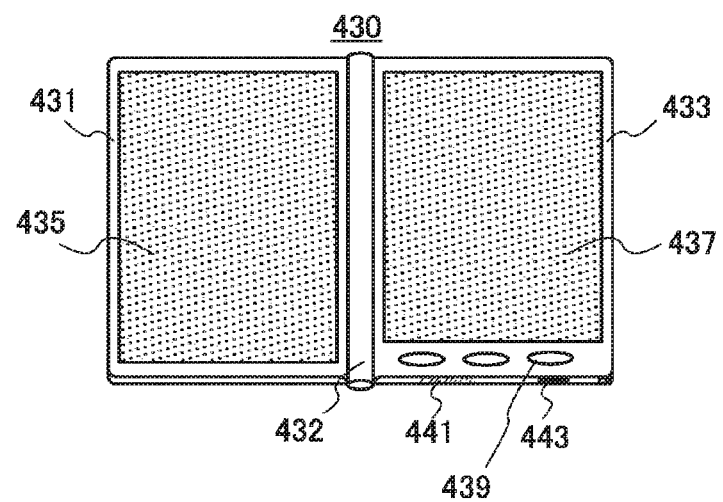

FIG. 3B illustrates an example of an e-book terminal. An e-book terminal 430 includes two housings, a first housing 431 and a second housing 433, which are combined with each other with a hinge 432. The first and second housings 431 and 433 can be opened and closed with the hinge 432 as an axis. A first display portion 435 and a second display portion 437 are incorporated in the first housing 431 and the second housing 433, respectively. In addition, the second housing 433 is provided with an operation button 439, a power switch 443, a speaker 441, and the like.

Figure 4:
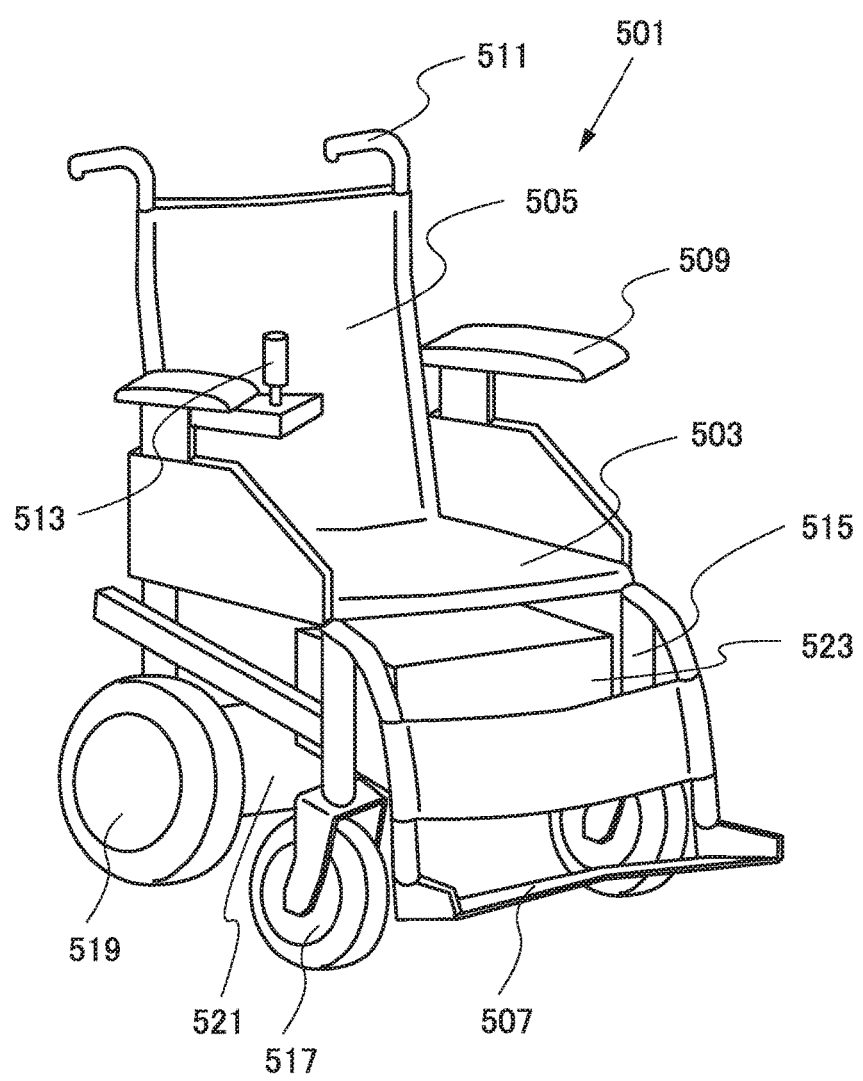
FIG. 4 is a perspective view illustrating an application example of a power storage device.

FIG. 4 is a perspective view of an electric wheelchair 501. The electric wheelchair 501 includes a seat 503 where a user sits down, a backrest 505 provided behind the seat 503, a footrest 507 provided at the front of and below the seat 503, armrests 509 provided on the left and right of the seat 503, and a handle 511 provided above and behind the backrest 505. A controller 513 for controlling the operation of the wheelchair is provided for one of the armrests 509. A pair of front wheels 517 is provided at the front of and below the seat 503 through a frame 515 provided below the seat 503, and a pair of rear wheels 519 is provided behind and below the seat 503. The rear wheels 519 are connected to a driver portion 521 including a motor, a brake, a gear, and the like. A control portion 523 including a battery, a power controller, a control means, and the like is provided under the seat 503. The control portion 523 is connected to the controller 513 and the driving portion 521. The driving portion 521 is driven through the control portion 523 with the operation of the controller 513 by the user and the control portion 523 controls the operation of moving forward, moving back, turning around, and the like, and the speed of the electric wheelchair 501.

The power storage device described in Embodiment 2 can be used in the battery of the control portion 523. The battery of the control portion 523 can be externally charged by electric power supply using plug-in systems.

Figure 5:
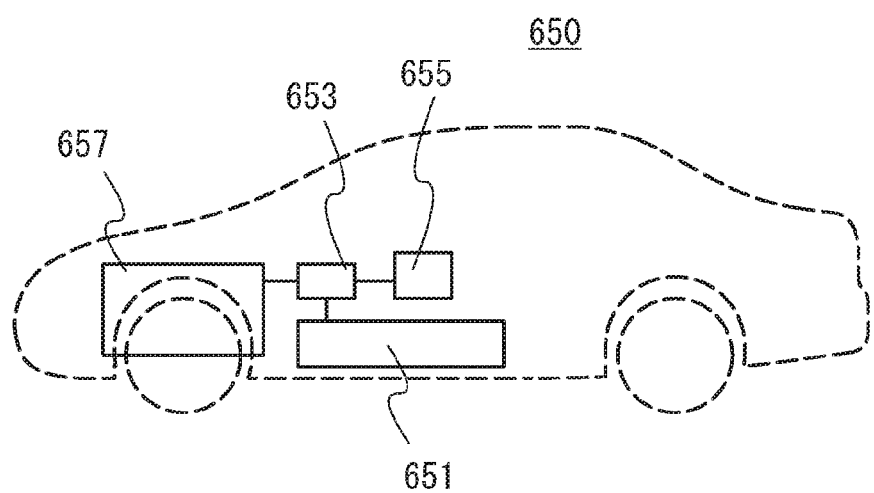
FIG. 5 is a diagram illustrating an application example of a power storage device.

FIG. 5 illustrates an example of an electric vehicle. A power storage device 651 is provided in an electric vehicle 650. The output of the electric power of the power storage device 651 is controlled by a control circuit 653 and the electric power is supplied to a driving device 657. The control circuit 653 is controlled by a computer 655.

The driving device 657 includes a DC motor or an AC motor either alone or in combination with an internal-combustion engine. The computer 655 outputs a control signal to the control circuit 653 in response to input data such as data of a driver's operation (e.g., acceleration, deceleration, or stop) and data during driving (e.g., data of an upgrade or a downgrade or data of a load on a driving wheel) of the electric vehicle 650. The control circuit 653 adjusts the electric energy supplied from the power storage device 651 in response to the control signal of the computer 655 to control the output of the driving device 657. In the case where the AC motor is mounted, an inverter which converts direct current into alternate current is incorporated.

The power storage device described in Embodiment 2 can be used in the battery of the power storage device 651. The power storage device 651 can be externally charged by electric power supply using a plug-in system.

Note that in the case where the electric propulsion vehicle is a train vehicle, the battery can be charged by electric power supply from an overhead cable or a conductor rail.

This embodiment can be combined with any other embodiment.

Embodiment 4

In this embodiment, an example in which a power storage device according to one embodiment of the present invention is used in a wireless power feeding system (hereinafter referred to as an RF power feeding system) will be described with reference to block diagrams in FIG. 6 and FIG. 7. In each of the block diagrams, independent blocks show elements within a power receiving device and a power feeding device, which are classified according to their functions. However, it may be practically difficult to completely separate the elements according to their functions; in some cases, one element can involve a plurality of functions.

First, the RF power feeding system will be described with reference to FIG. 6.

A power receiving device 800 is an electronic device or an electric propulsion vehicle which is driven by electric power supplied from a power feeding device 900, and can be applied to another object which is driven by electric power, as appropriate. Typical examples of the electronic device include cameras such as digital cameras or video cameras, digital photo frames, mobile phones (also referred to as cellular phones or cellular phone devices), portable game machines, portable information terminals, audio reproducing devices, display devices, computers, and the like. Typical examples of the electric propulsion vehicles include electric vehicles, hybrid electric vehicles, train vehicles, maintenance vehicles, carts, wheelchairs, and the like. In addition, the power feeding device 900 has a function of supplying electric power to the power receiving device 800.

Figure 6:
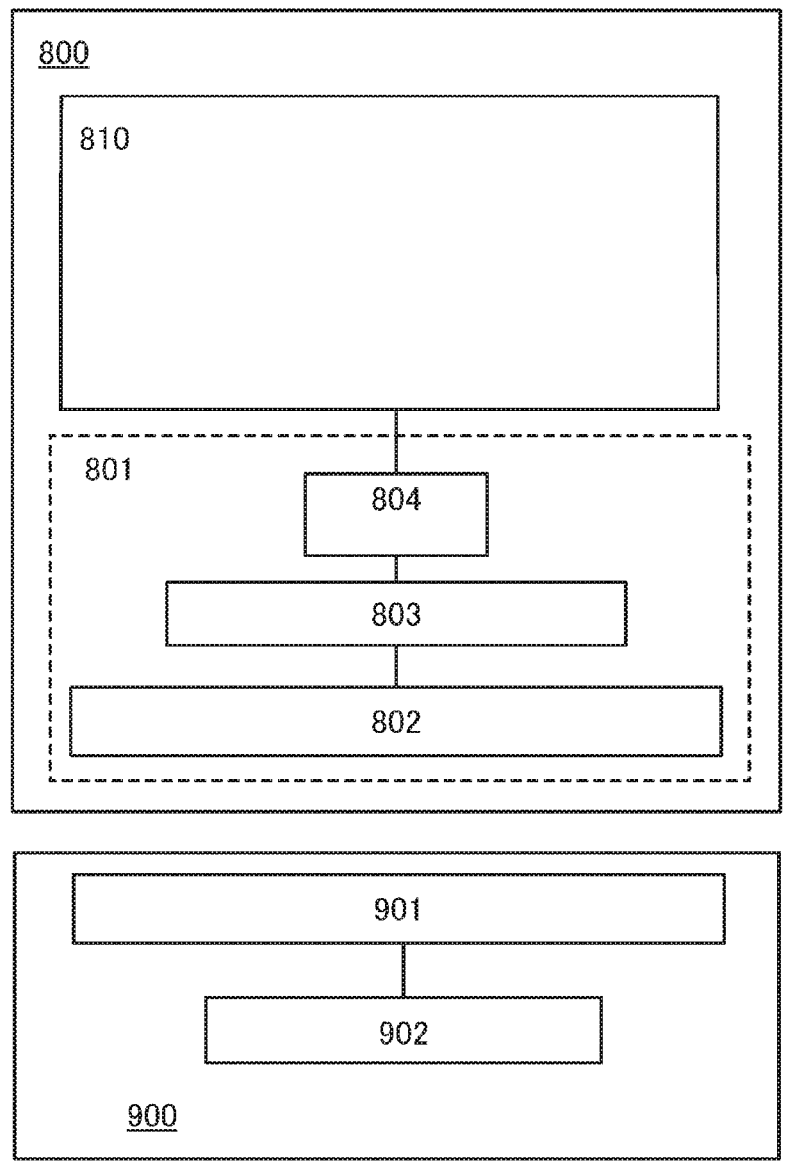
FIG. 6 is a diagram illustrating an example of a configuration of a wireless power feeding system.

In FIG. 6, the power receiving device 800 includes a power receiving device portion 801 and a power load portion 810. The power receiving device portion 801 includes at least a power receiving device antenna circuit 802, a signal processing circuit 803, and a power storage device 804. The power feeding device 900 includes a power feeding device antenna circuit 901 and a signal processing circuit 902.

The power receiving device antenna circuit 802 has a function of receiving a signal transmitted by the power feeding device antenna circuit 901 or transmitting a signal to the power feeding device antenna circuit 901. The signal processing circuit 803 processes a signal received by the power receiving device antenna circuit 802 and controls charging of the power storage device 804 and supplying of electric power from the power storage device 804 to the power load portion 810. The power load portion 810 is a driving portion which receives electric power from the power storage device 804 and drives the power receiving device 800. Typical examples of the power load portion 810 include a motor, a driving circuit, and the like. Another power load portion can be alternatively used as appropriate. The power feeding device antenna circuit 901 has a function of transmitting a signal to the power receiving device antenna circuit 802 or receiving a signal from the power receiving device antenna circuit 802. The signal processing circuit 902 controls operation of the power feeding device antenna circuit 901. That is, the signal processing circuit 902 can control the intensity, the frequency, or the like of a signal transmitted by the power feeding device antenna circuit 901.

The power storage device according to one embodiment of the present invention is used as the power storage device 804 included in the power receiving device 800 in the RF power feeding system.

With the use of the power storage device according to one embodiment of the present invention in the RF power feeding system, the amount of power storage can be larger than that in a conventional power storage device. Therefore, the time interval of the wireless power feeding can be longer (frequent power feeding is not needed).

In addition, with the use of the power storage device according to one embodiment of the present invention in the RF power feeding system, the power receiving device 800 can be formed to be compact and lightweight if the amount of power storage with which the power load portion 810 can be driven is the same as that in a conventional power storage device. Therefore, the total cost can be reduced.

Next, another example of the RF power feeding system will be described with reference to FIG. 7.

Figure 7:
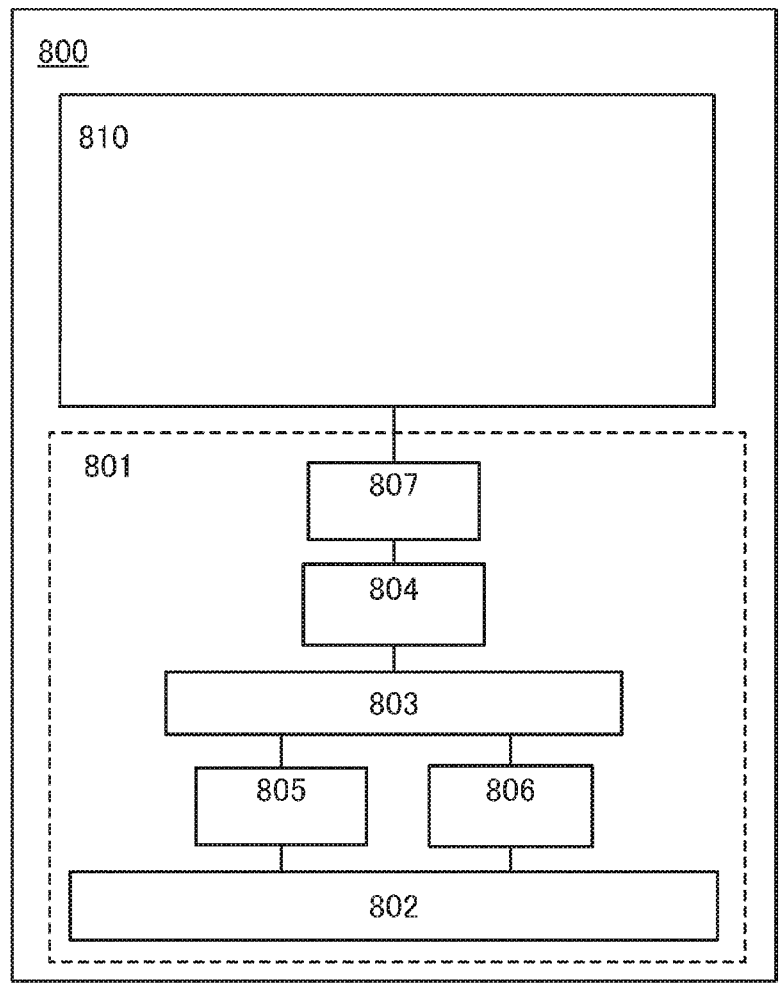
FIG. 7 is a diagram illustrating an example of a configuration of a wireless power feeding system.
Figure 7:
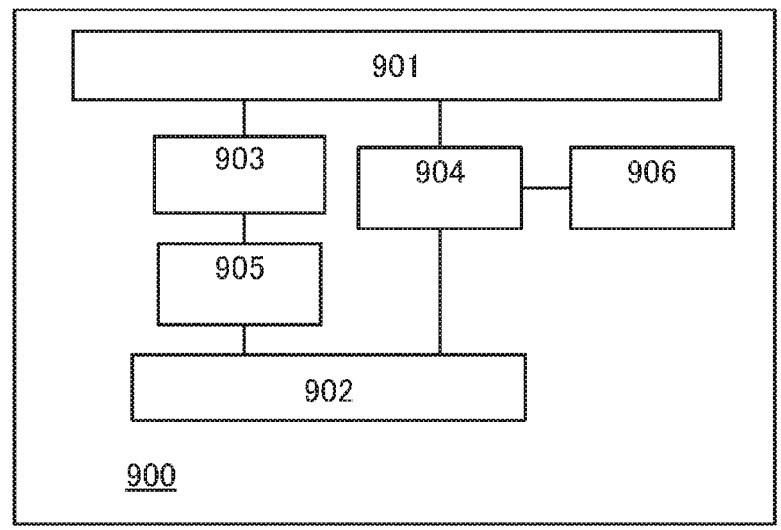

In FIG. 7, the power receiving device 800 includes the power receiving device portion 801 and the power load portion 810. The power receiving device portion 801 includes at least the power receiving device antenna circuit 802, the signal processing circuit 803, the power storage device 804, a rectifier circuit 805, a modulation circuit 806, and a power supply circuit 807. In addition, the power feeding device 900 includes at least the power feeding device antenna circuit 901, the signal processing circuit 902, a rectifier circuit 903, a modulation circuit 904, a demodulation circuit 905, and an oscillator circuit 906.

The power receiving device antenna circuit 802 has a function of receiving a signal transmitted by the power feeding device antenna circuit 901 or transmitting a signal to the power feeding device antenna circuit 901. When the power receiving device antenna circuit 802 receives a signal transmitted by the power feeding device antenna circuit 901, the rectifier circuit 805 has a function of generating DC voltage from the signal received by the power receiving device antenna circuit 802. The signal processing circuit 803 has a function of processing a signal received by the power receiving device antenna circuit 802 and controlling charging of the power storage device 804 and supplying of electric power from the power storage device 804 to the power supply circuit 807. The power supply circuit 807 has a function of converting voltage stored by the power storage device 804 into voltage needed for the power load portion. The modulation circuit 806 is used when a certain response is transmitted from the power receiving device 800 to the power feeding device 900.

With the power supply circuit 807, electric power supplied to the power load portion 810 can be controlled. Thus, overvoltage application to the power load portion 810 can be suppressed, and deterioration or breakdown of the power receiving device 800 can be reduced.

In addition, with the modulation circuit 806, a signal can be transmitted from the power receiving device 800 to the power feeding device 900. Therefore, when the amount of charged power in the power receiving device 800 is judged and the power receiving device 800 is charged with a certain amount of power, a signal is transmitted from the power receiving device 800 to the power feeding device 900 so that power feeding from the power feeding device 900 to the power receiving device 800 can be stopped. As a result, it is possible not to fully charge the power storage device 804, so that deterioration or breakdown of the power storage device 804 due to overcharge can be reduced and the number of charge times of the power storage device 804 can be increased.

The power feeding device antenna circuit 901 has a function of transmitting a signal to the power receiving device antenna circuit 802 or receiving a signal from the power receiving device antenna circuit 802. When a signal is transmitted to the power receiving device antenna circuit 802, the signal processing circuit 902 generates a signal which is transmitted to the power receiving device. The oscillator circuit 906 is a circuit which generates a signal with a certain frequency. The modulation circuit 904 has a function of applying voltage to the power feeding device antenna circuit 901 on the basis of a signal generated by the signal processing circuit 902 and a signal with a certain frequency generated by the oscillator circuit 906. Thus, a signal is output from the power feeding device antenna circuit 901. On the other hand, when reception of a signal from the power receiving device antenna circuit 802 is performed, the rectifier circuit 903 has a function of rectifying the received signal. From signals rectified by the rectifier circuit 903, the demodulation circuit 905 extracts a signal transmitted from the power receiving device 800 to the power feeding device 900. The signal processing circuit 902 has a function of analyzing the signal extracted by the demodulation circuit 905.

Note that any circuit may be provided between circuits as long as the RF power feeding can be performed. For example, after the power receiving device 800 receives electromagnetic waves and the rectifier circuit 805 generates DC voltage, constant voltage may be generated by a circuit such as a DC-DC converter or a regulator. Thus, overvoltage application to the inside of the power receiving device can be suppressed.

The power storage device according to one embodiment of the present invention is used as the power storage device 804 included in the power receiving device 800 in the RF power feeding system.

With the use of the power storage device according to one embodiment of the present invention in the RF power feeding system, the amount of power storage can be larger than that in a conventional power storage device. Therefore, the time interval of the wireless power feeding can be longer (frequent power feeding is not needed).

In addition, with the use of the power storage device according to one embodiment of the present invention in the RF power feeding system, the power receiving device 800 can be formed to be compact and lightweight if the amount of power storage with which the power load portion 810 can be driven is the same as that in a conventional power storage device. Therefore, the total cost can be reduced.

Note that when the power storage device according to one embodiment of the present invention is used in the RF power feeding system and the power receiving device antenna circuit 802 and the power storage device 804 overlap with each other, it is preferable that the impedance of the power receiving device antenna circuit 802 be not changed by deformation of the power storage device 804 due to charge and discharge of the power storage device 804. When the impedance of the antenna is changed, in some cases, electric power is not supplied sufficiently. For example, the power storage device 804 may be placed in a battery pack formed using metal or ceramics. Note that in that case, the power receiving device antenna circuit 802 and the battery pack are preferably separated from each other by several tens of micrometers or more.

In this embodiment, the charging signal has no limitation on its frequency and may have any band of frequency as long as electric power can be transmitted. For example, the charging signal may have any of an LF band of 135 kHz (long wave), an HF band of 13.56 MHz, a UHF band of 900 MHz to 1 GHz, and a microwave band of 2.45 GHz.

A signal transmission method may be selected as appropriate from various methods including an electromagnetic coupling method, an electromagnetic induction method, a resonance method, and a microwave method. In one embodiment of the present invention, in order to prevent energy loss due to foreign substances containing moisture, such as rain and mud, the electromagnetic induction method or the resonance method using a low frequency band, specifically, frequencies of a short wave of 3 MHz to 30 MHz, a medium wave of 300 kHz to 3 MHz, a long wave of 30 kHz to 300 kHz, or a very-long wave of 3 kHz to 30 kHz, may be used.

This embodiment can be combined with any other embodiment.

This application is based on Japanese Patent Application serial no. 2010-151742 filed with Japan Patent Office on Jul. 2, 2010, the entire contents of which are hereby incorporated by reference.

What is claimed is:

1. A method for forming an electrode material comprising:
    forming a first mixture material by adding a solution to a compound serving as a supply source of Li, a compound serving as a supply source of A, and a compound serving as a supply source of Si and by mixing the solution and the compounds for the first mixture material;
    subjecting the first mixture material to first heat treatment to form a first material from the first mixture material;
    forming a second mixture material by adding a compound serving as a supply source of Li, a compound serving as a supply source of E, and a compound serving as a supply source of $PO_4$ to the first material and by mixing the first mixture material and the compounds for the second mixture material; and
    subjecting the second mixture material to second heat treatment to form a second material from the second mixture material,
    wherein A represents at least one kind of an element selected from Fe, Co, Mn and Ni, and
    wherein E represents at least one kind of an element selector from Fe, Co, Mn and Ni.

2. The method for forming the electrode material according to claim 1,
    wherein the second material comprises:
        a core containing a compound represented by a general formula $Li_2ASiO_4$ as a main component; and
        a covering layer containing a compound represented by a general formula $LiEPO_4$ as a main component, and
    wherein the covering layer covers the core.

3. The method for forming the electrode material according to claim 2, wherein the compound represented by the general formula $LiEPO_4$ has high conductivity as compared to the compound represented by the general formula $Li_2ASiO_4$.

4. The method for forming the electrode material according to claim 1, the method further comprising the step of:

adding an organic compound to the second mixture material after forming the second mixture material.

5. The method for forming the electrode material according to claim 1, wherein the second mixture material comprises a solvent.

6. The method for forming the electrode material according to claim 2, wherein the second material comprises a carbon layer on the covering layer.

7. The method for forming the electrode material according to claim 1, wherein a solid solution of $LiASiO_4$ and $LiEPO_4$ is formed during the second heat treatment.

8. The method for forming the electrode material according to claim 2, wherein a solid solution is formed between the core and the covering layer.

9. The method for forming the electrode material according to claim 1, the method further comprising the step of:
grinding the first material after the first heat treatment.

10. The method for forming the electrode material according to claim 1, wherein forming the second mixture material is performed by a ball mill treatment.

11. A method for forming an electrode material comprising:
mixing a compound serving as a supply source of Li, a compound serving as a supply source of A, and a compound serving as a supply source of Si to form a first mixture material;
performing first heat treatment on the first mixture material to form a first material;
mixing the first material, a compound serving as a supply source of Li, a compound serving as a supply source of E, and a compound serving as a supply source of $PO_4$ to form a second mixture material; and
performing second heat treatment on the second mixture material to form a second material,
wherein A represents at least one kind of an element selected from Fe, Co, Mn and Ni, and
wherein E represents at least one kind of an element selector from Fe, Co, Mn and Ni.

12. The method for forming the electrode material according to claim 11,
wherein the second material comprises:
a core containing a compound represented by a general formula $Li_2ASiO_4$; and
a covering layer containing a compound represented by a general formula $LiEPO_4$, and
wherein the covering layer covers the core.

13. The method for forming the electrode material according to claim 11, further comprising the step of:
adding an organic compound to the second mixture material after forming the second mixture material.

14. The method for forming the electrode material according to claim 11, wherein the second mixture material comprises a solvent.

15. The method for forming the electrode material according to claim 12, wherein the second material comprises a carbon layer on the covering layer.

16. The method for forming the electrode material according to claim 11, wherein a solid solution of $LiASiO_4$ and $LiEPO_4$ is formed during the second heat treatment.

17. The method for forming the electrode material according to claim 12, wherein a solid solution is formed between the core and the covering layer.

18. The method for forming the electrode material according to claim 11, the method further comprising the step of:
grinding the first material after the first heat treatment.

19. The method for forming the electrode material according to claim 11, wherein forming the second mixture material is performed by a ball mill treatment.

* * * * *